Sept. 28, 1965 W. A. HUBER 3,209,259

MONOCYCLE POSITION MODULATION SYSTEM

Filed Nov. 6, 1961 5 Sheets-Sheet 1

INVENTOR,
WILLIAM A. HUBER.

BY Harry M. Saragovitz

ATTORNEY

MONOCYCLE POSITION MODULATION SYSTEM

Filed Nov. 6, 1961 5 Sheets-Sheet 2

INVENTOR,
WILLIAM A. HUBER.

BY Harry M. Saragovitz

ATTORNEY.

INVENTOR,
WILLIAM A. HUBER.
BY Harry M. Saragovitz
ATTORNEY.

INVENTOR,
WILLIAM A. HUBER

BY *Harry M. Saragovitz*

ATTORNEY.

INVENTOR,
WILLIAM A. HUBER.

BY Harry M. Saragovitz
ATTORNEY.

United States Patent Office 3,209,259

Patented Sept. 28, 1965

3,209,259

MONOCYCLE POSITION MODULATION SYSTEM

William A. Huber, 216 Monroe Ave., Spring Lake, N.J.

Filed Nov. 6, 1961, Ser. No. 150,601
13 Claims. (Cl. 325—38)
(Granted under Title 35, U.S. Code (1952), sec. 266)

The invention described herein may be manufactured and used by or for the Government for governmental purposes without the payment of any royalty thereon.

This invention relates to digital communication systems and more particularly, to a new system and method hereinafter called "Monocycle Position Modulation (MPM)." MPM converts the information contained in conventional binary digital signals to a new form whereby the information may be conveyed at a substantially faster rate over a reduced bandwidth as compared to conventional techniques for transmitting binary digital signals.

Pulse code modulation systems employing binary codes are the logical first choice for satisfying any pulse code modulation communication requirement. Of all known pulse code modulation signal forms, these binary systems are the easiest to implement and yield best performance in the face of interferences and uncertainties met in communications applications. However, binary systems are limited in the rate at which information can be transmitted through a given bandwidth, i.e., if the transmission rate of the binary signal is increased, the bandwidth must be increased accordingly since they are directly proportional.

Information in the binary digital language is conveyed by use of established codes. For any given code the number of timing periods used to form the characters is constant. Inasmuch as only one bit of information can be transmitted during each timing period as a "1" (mark) or "0" (space), these marks and spaces are frequently referred to as bits. For example, the Fieldata code requires eight bits per character (six information bits, one control bit, and one parity bit) and is referred to as an eight bit code. The amount, rate and accuracy of information that can be conveyed by a binary digital system is related to the code structure which consists of all possible combinations of marks and spaces within the assigned code time interval. Each of these code combinations is assigned to a character, so that the more combinations there are available the more characters it is possible to transmit. The number of combinations which can be obtained from a given code can be determined as follows: If S is the number of choices at each timing period and $k$ is the number of timing periods per character, the number of different possible combinations C will be $$C=S^k \quad (1)$$

For the binary digital system $S=2$ and for the Fieldata code $k=8$ so there will be $C=2^8=256$ different possible combinations for this code using binary digital signals.

In accordance with the "Monocycle Position Modulation (MPM)" system of this invention, the number of different possible code combinations in the above example is increased from $C=S^k$ to $C=S^{3k/2}$. This increase in coding density is obtained through orthogonal or time quantized signal encoding and is accomplished in such a manner that the binary nature of the signal is retained, i.e., in amplitude only the "off" and "on" or zero and unity states are significant. Intelligence is conveyed in MPM systems by the time location of a single cycle of a minus (−) cosine bit within multiples of 2T timing periods, where T is the duration of the −cosine bit and is equal to a single period of the −cosine wave. Each −cosine bit is time quantized to one of eight distinct locations within the 2T timing period with which it is associated.

The approach that MPM offers as a method for increasing the information density of a signal stream can be illustrated as follows. With conventional binary digital methods it is possible to transmit any one of four different code combinations during two timing periods T, namely 00, 01, 10, and 11 or $2^k=2^2=4$. During the same time 2T with a single pulse of the same duration T as each of the binary pulses, any one of eight different codes may be transmitted using MPM techniques as given by $2^{3k/2}=2^3=8$. This increase in information density can be extended to the tranmission of $2^6$ bits in a time period where now $2^4$ bits are transmitted, $2^9$ bits in a period where now $2^6$ bits are transmitted, $2^{12}$ bits in a period where now $2^8$ bits are transmitted by binary techniques, etc. This means that by using MPM it is possible to transmit any one of 4096 different characters within the same time previously required to transmit any one of 256 different characters using conventional binary eight bit code techniques. An important application for these extended code combinations is that it is possible to transmit words using MPM at the same rate characters were previously transmitted using binary techniques and to do so within the same bandwidth. This can be accomplished, for example, by selecting a 4096 word vocabulary and assigning a code to each word in the vocabulary. At the transmitter the word is converted to the assigned code which is transmitted. When the code is detected by the receiver it is used to identify the corresponding word from a local stored vocabulary. Assuming that the average word in the selected vocabulary has five letters, it is possible to realize a transmission speed gain of five. Even if each word is repeated twice, the transmission speed gain is greater than two. Of course, the method can be extended to other size vocabularies, e.g., in ten timing periods T a 32,768 word vocabulary could be utilized. It is also possible to increase the reliability of a noisy channel by slowing down the MPM transmission to the conventional information rate.

If the MPM signal is formed by a conversion of an ordinary binary digital signal stream into an MPM format, a conversion made in real time will enable the MPM signal to be transmitted at a one-third slower rate than the original binary signal. If the binary digital signal is obtained from storage, such as tape, it is possible to realize a transmission speed gain of one-third without increasing the necessary bandwidth required.

Thus, MPM systems are ideally suited for situations where time, bandwidth, and storage are at a premium, such as in satellite communications where the ability to transmit and receive at a one-third increase in speed is a distinctive advantage when time for transmission and reception is limited with respect to a given location. By encoding with MPM, the internal information storage of the satellite can be increased by one-third when tape or the like types of storage are used since the time savings noted previously are directly related to space savings in storage media of this type. For example, using magnetic tape, one magnetic or MPM bit representing three binary bits may be stored in two-thirds of the linear space on the tape as compared to the space required for the equivalent information carried by three binary bits.

In a preferred embodiment of the invention, binary signals are converted to MPM signals by first feeding the binary signal train to a signal decoder having eight outputs. Each of these outputs corresponds to a different one of the possible combinations of three successive binary pulses. The outputs of the signal decoder are then used as gating signals to cause the generation of single cycles of a −cosine wave, the positions of which in one of eight possible locations within each basic time period or frame are established by the particular binary sequence they represent. Thus, each original sequence of three binary pulses is represented by one MPM pulse.

The receiver is operated in synchronism with the MPM signal transmitter. Since the formation of the MPM signal is such that each —cosine bit is orthogonally encoded on the time scale, its time location is established at the receiver by phase correlation between the incoming MPM signal and four locally generated quadrature signals. This correlation circuit has eight outputs which correspond to the eight possible MPM codes or positions and from which the original binary signal is reformed by generating the three successive binary bits associated with each output whenever that output is energized.

Accordingly, it is an object of this invention to provide a high-density coding system called Monocycle Position Modulation.

Another object of this invention is to provide a high-density coding system having binary characteristics and using orthogonal encoding to enable an increase of one-third in transmission speed over conventional binary without increasing the bandwidth required.

Still another object of this invention is to provide a high information density coding system in which the information is conveyed by time quantizing an individual cycle of a — cosine wave to one of eight distinct positions within each timing period.

Further objects and features of the invention will become apparent upon consideration of the following description taken in conjunction with the drawing in which.

Figure 7A:
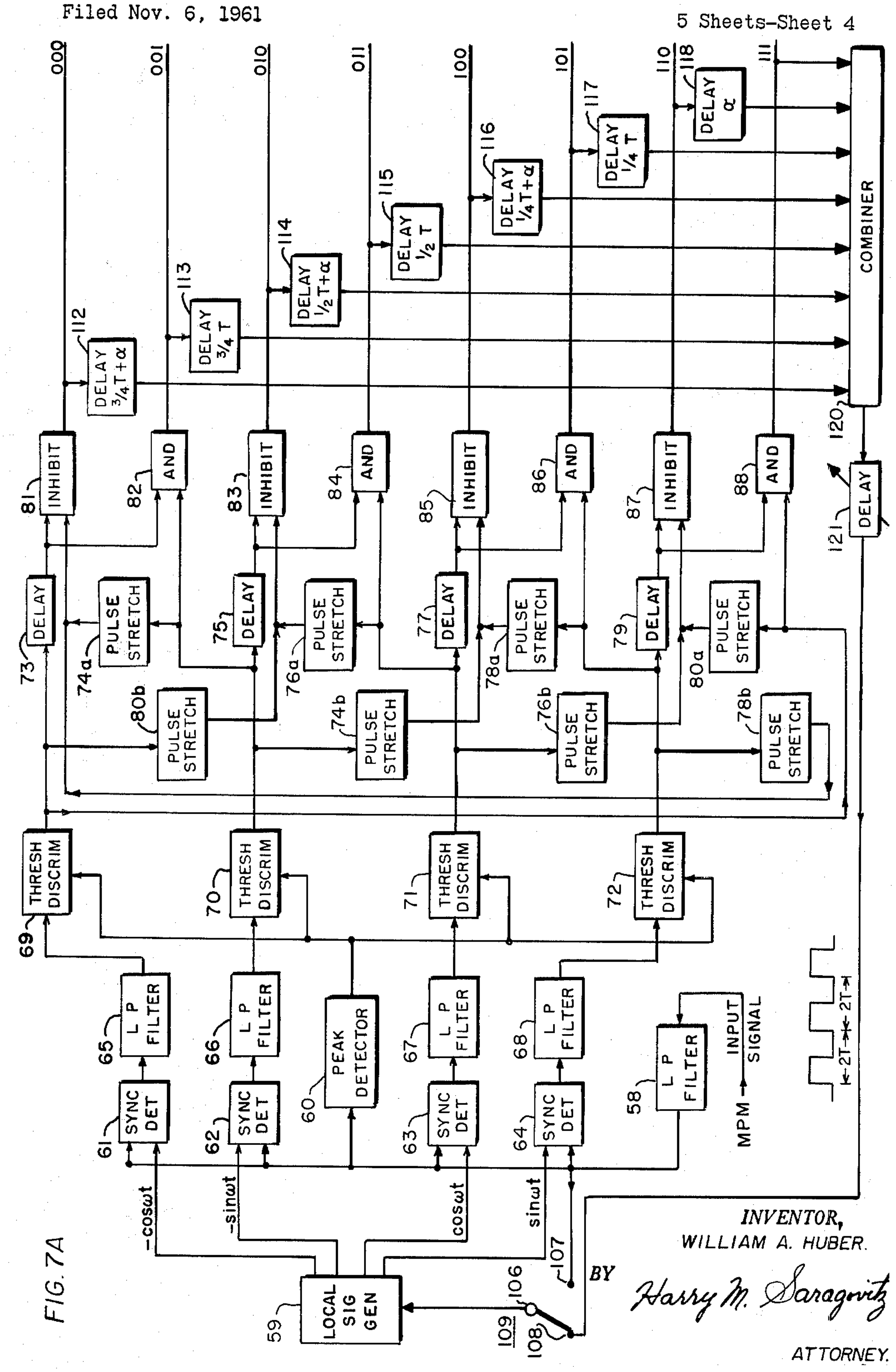
Figure 8:
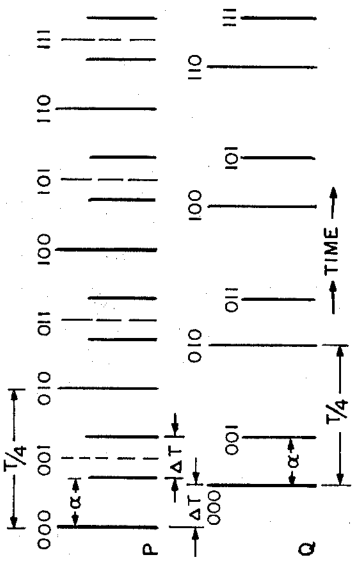
Figure 9:
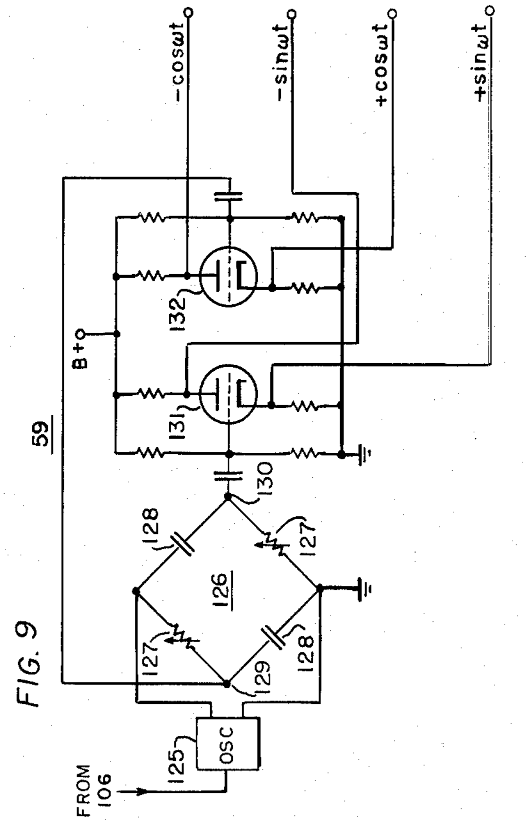
Figure 7B:
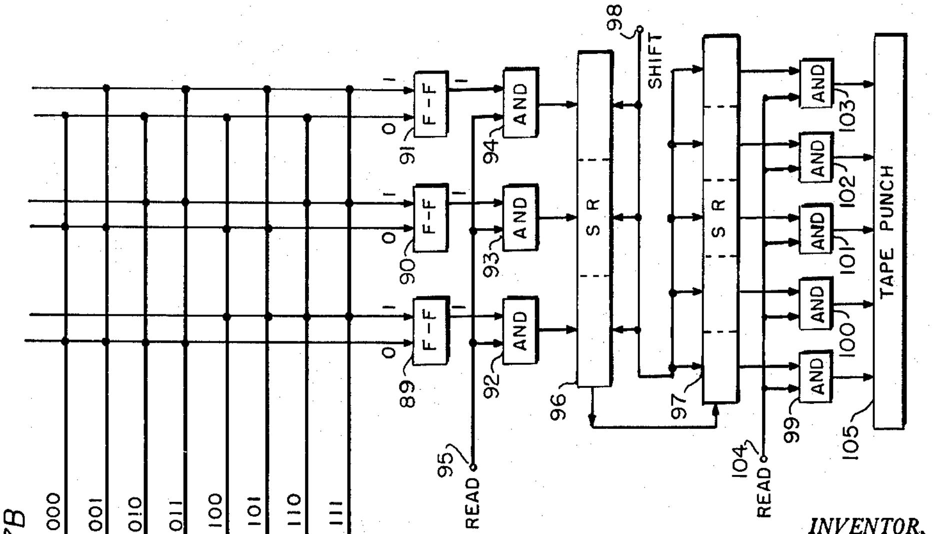

FIGS. 7A and 7B, taken together as a unit; illustrate a block diagram of an MPM signal decoder;

FIG. 8 shows waveforms useful in explaining the operation of FIGS. 7A and 7B; and FIG. 9 is a detailed circuit diagram of a portion of the circuit of FIGS. 7A and 7B.

Figure 1:
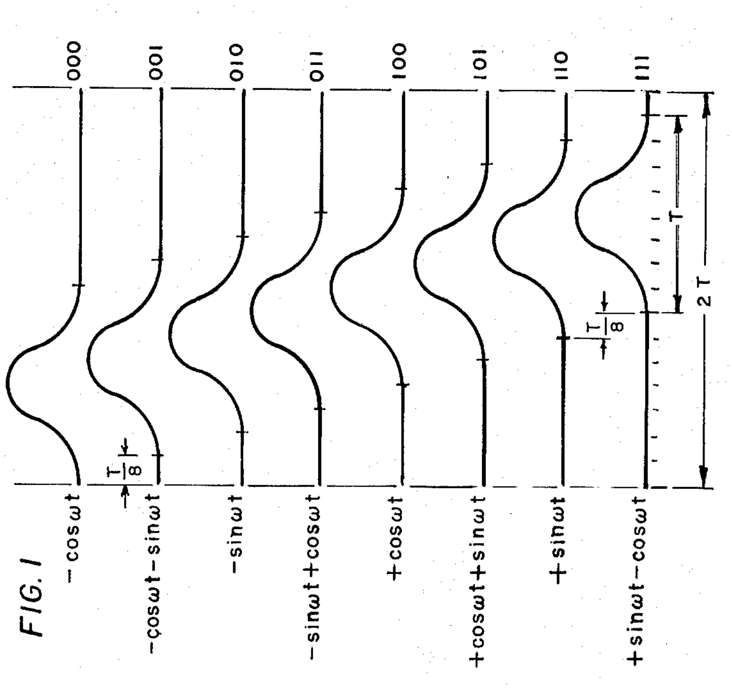
FIGS. 1 to 3 are graphical illustrations useful in explaining the invention.
Figure 2:
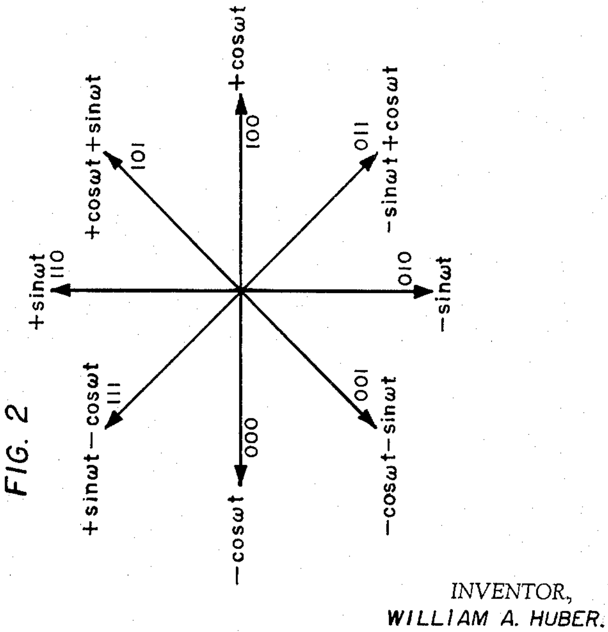

Referring now to FIG. 1, there is shown a single cycle of each of eight —cosine waveforms having a period or length T. Each of these eight different —cosine waveforms is time quantized to one of eight distinct positions within a basic timing period 2T, these positions being fixed at successive intervals of $T/8$. These different positions are equivalent to phase modulation of a —cosine signal on an individual cycle basis as will be more readily understood by referring to the vector diagram of FIG. 2. The vectors shown in FIG. 2 are stationary and represent the phase angular relationship between the orthogonal signals $\pm$ cos $\omega t$ and $\pm$ sin $\omega t$ and their sums. This results in eight separate signals which are represented by the eight vectors shown in FIG. 2. The radian frequency $\omega=2\pi f$ is the same for all the signals. These eight signals may be derived from a single continuous —cosine waveform through the use of fixed delays of different length or they may be generated by gating a —cosine generator on for a single cycle coincident with any one of the $T/8$ time intervals mentioned above. The latter method is preferred and will be discussed in detail in conjunction with FIG. 4.

In order to develop an encoded MPM signal stream, one of the eight signals shown in FIG. 1 is gated into the output circuit for each timing period 2T. Regardless of which of the two methods is used, the particular signal selected is always gated for just one cycle and the start and finish of this cycle is always coincident with successive negative peaks of the wave which are assumed to be at ground potential. The gated wave is therefore referred to a —cosine bit.

To convert binary signals into MPM and vice-versa, it is necessary to establish a definite relationship between the two. This has been done by arbitrarily assigning the three bit binary sequence "000" to the MPM pulse or —cosine bit which begins at the start of the timing period 2T, by assigning the binary sequence "001" to the MPM pulse which occurs $T/8$ seconds later, and so on, with the binary sequence "111" being assigned to the eighth MPM pulse which starts $7T/8$ seconds after the first. The binary sequence represented by each of the eight MPM signals is shown in FIGS. 1 and 2. It is obvious that the relationships shown could be changed without altering the basic principle of the invention, but the ensuing discussion is limited to the particular example given above since the circuits and logic would be similar for all the possible different relationships.

Figure 3:
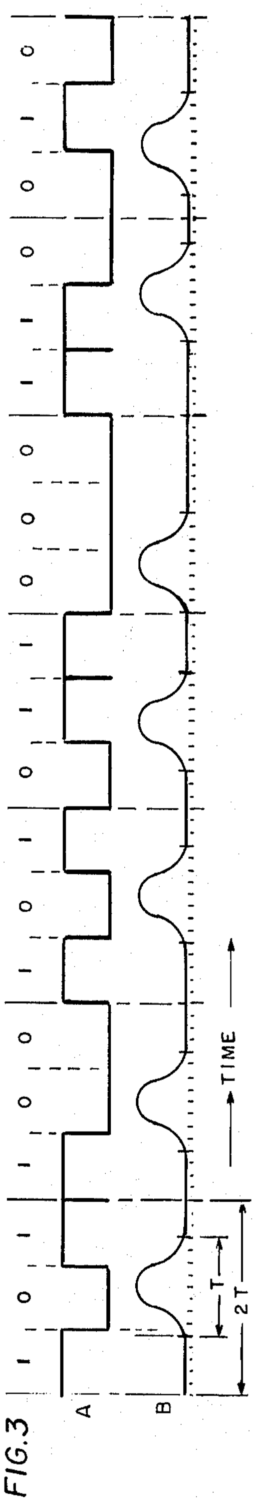

Curve A of FIG. 3 shows a typical waveform of a binary pulse train which might occur in any digital system such as a teletype system. In this binary train the presence of a pulse indicates a "1" and the absence of a pulse indicates a "0." These designations are written for each pulse interval directly above curve A. Curve B shows the MPM signal train which is formed from or is equivalent to the binary train shown in curve A. For every three consecutive binary bits or pulses, one MPM pulse is needed to convey the same information. The relative positions of the —cosine bits within each timing period 2T are determined in accordance with the relationships given in FIG. 1. Thus for the first group of three binary bits "101," the —cosine MPM bit is delayed $5T/8$ seconds from the start of the first 2T timing period, the —cosine MPM bit for the second group of three binary bits "100" is delayed $4T/8$ seconds from the start of the second 2T timing period, and so forth. It will be noted from a comparison of curves A and B that each MPM pulse has a duration which is one and one-half times as long as that of each binary pulse and that only one MPM pulse is used for every three binary pulse intervals. If the binary train of curve A is being transmitted through a given bandwidth at its maximum rate, it is apparent that the MPM signal can be transmitted through a narrower bandwidth if the same information rate is used. On the other hand, using the same bandwidth, the MPM signal train of curve B can be transmitted in two-thirds the time. If this is done, each —cosine pulse would have the same length or duration as each binary pulse in curve A. Such a speed increase in transmitting the information can be accomplished by feeding the binary signal from store, such as punched tape, to an MPM encoder at one and one-half times the rate which would be used for normal transmission of the binary signal train.

Figure 4:
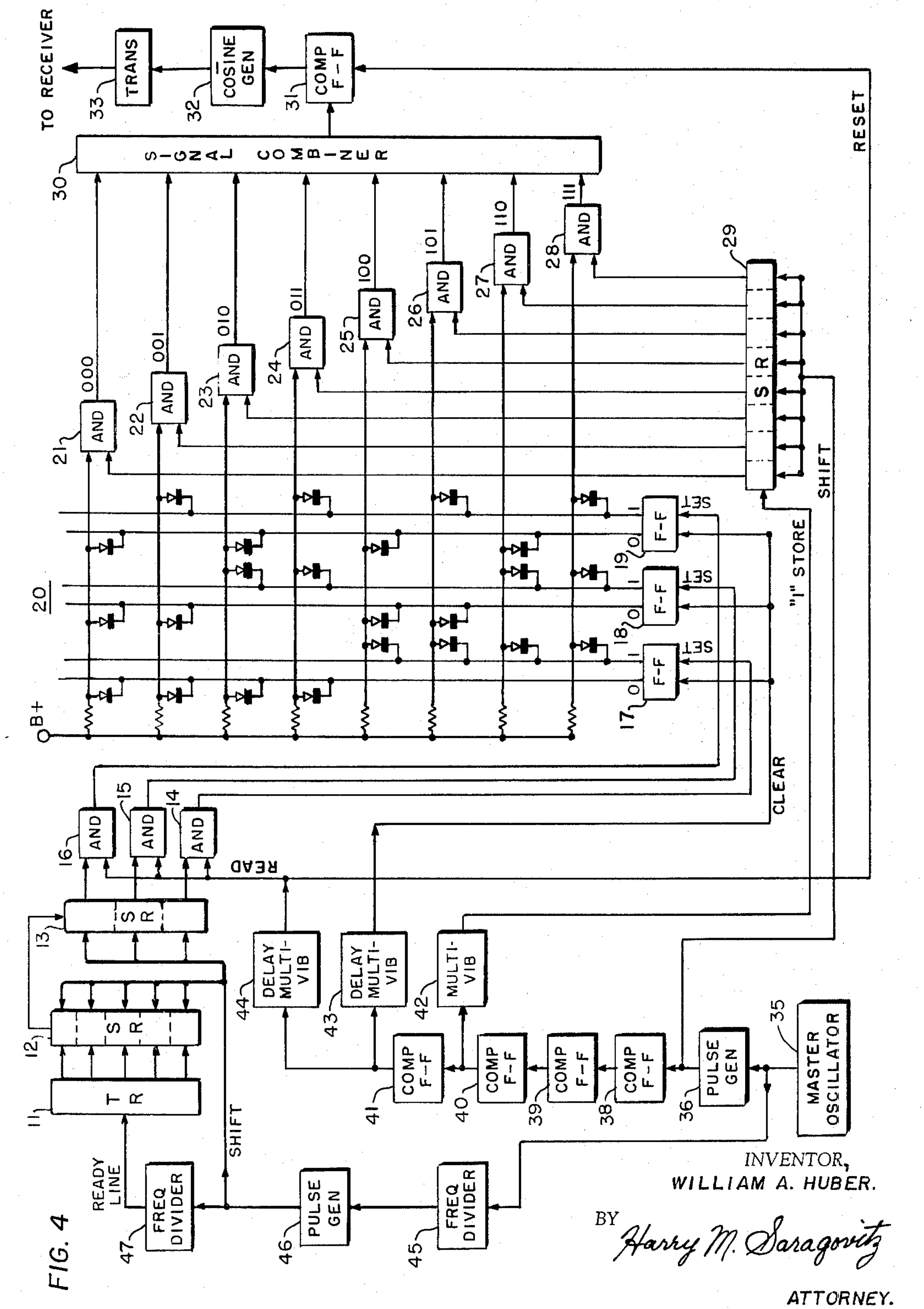
FIG. 4 is a block diagram of a preferred example of an MPM signal encoder.

In the MPM signal encoder shown in FIG. 4 the binary digital information to be transmitted is shown as being supplied from a standard teletype tape reader 11 which accepts five baud punched tape. Each line of the tape is read and stored in parallel in a five-stage shift register 12. The information stored in shift register 12 is supplied in series to a three-stage shift register 13, the outputs of which are supplied in parallel to AND gates 14, 15, and 16, respectively. Gates 14, 15, and 16 are supplied with a "read" or enabling pulse each time register 13 is filled with a different group of three successive binary bits from the output of register 12. The outputs of gates 14, 15, and 16 are connected to flip-flops 17, 18 and 19, respectively. Prior to the application of a "read" pulse to gates 14, 15, and 16, a "clear" pulse is applied to flip-flops 17, 18 and 19 to set them to "0." They will remain set to "0" if the stages of shift register 13 connected to the respective ones of gates 14, 15 or 16 contain "0" since no "read" pulse will be passed by gates 14, 15, and 16 when this occurs. If any stages of register 13 contain a "1" at the time the "read" pulse is applied to gates 14, 15, and 16, a pulse will be passed by each of the gates associated with such stages and will cause the respective ones of flip-flops 17, 18, and 19 connected to the outputs of the gates passing these pulses to be set to "1." By this process, the three binary bits have been transferred from shift register 13 to flip-flops 17, 18, 19 where they will remain until the next "clear" pulse is applied to the flip-flops. This transfer is necessary so that shift register 13 may be filled with the next three binary bits while the remainder of the encoder circuit is utilizing the information stored in flip-flops 17, 18 and 19 to form the MPM pulse which corresponds thereto.

The two outputs of each of flip-flops 17, 18, 19 are supplied to a conventional rectangular three-variable diode matrix 20 having eight outputs which correspond to the eight possible combinations of binary information which could be stored in flip-flops 17, 18 and 19. Each horizontal line or output of matrix 20 and the three diodes associated therewith comprises an AND gate which will have an output only if the output lines from flip-flops 17, 18 and 19 to which its diodes are connected have a high or positive output applied thereto. Thus, the first or top line of matrix 20 will apply a positive output energizing signal to AND gate 21 only when all three flip-flops 17, 18 and 19 are set to "0" representing the binary sequence "000." The second line will apply an output energizing signal to AND gate 22 when flip-flops 17 and 18 are set to "0" and flip-flop 19 is set to "1" representing the binary sequence "001." A similar examination of each of the remaining output lines of matrix 20 shows that AND gate 23 receives an energizing signal for the binary sequence "010," AND gate 24 receives an energizing signal for the binary sequence "011," AND gate 25 receives an energizing signal for the sequence "100," AND gate 26 receives an energizing signal for the sequence "101," AND gate 27 an energizing signal for the sequence "110," and AND gate 28 receives an energizing signal for the binary sequence "111."

Enabling pulses for gates 21 to 28 are supplied by an eight-stage shift register 29 having an output line from each stage connected respectively to gates 21 to 28, the first stage being connected to gate 21, the second stage to gate 22, and so forth with the eighth stage being connected to gate 28. These output lines from shift register 29 will be energized only if the stages to which they are connected contain a "1." Initially, all stages of register 29 contain "0," but just after a "read" pulse is applied to gates 14, 15 and 16, a "1" is stored in the first stage of register 29. This then provides an enabling pulse for gate 21 and as this "1" is shifted through the subsequent stages, the remaining gates 22 to 28 receive enabing pulses in turn. When this first "1" is shifted out of the register a new "1" is stored in the first stage and the process repeats. Shift register 29 completes two of the above cycles for each setting of flip-flops 17, 18 and 19 so that there will be two output pulses from one of gates 21 to 28 for each three input binary bits supplied to shift-register 13. A more detailed description of the operation of this circuit will be given in a subsequent description of the operation of FIG. 4.

The output pulses from AND gates 21 to 28 are supplied to a signal combiner or OR circuit 30 which supplies the output pulses from gates 21 to 28 in series to a complementary flip-flop 31. Flip-flop 31 is reset to "off" each time a "read" pulse is applied to gates 14, 15, and 16. The first of the two output pulses from signal combiner 30 which follows the reset pulse turns flip-flop 31 "on" and the next pulse from signal combiner 30 causes flip-flop 31 to return to its "off" state. This sequence is followed by the next "reset" pulse to flip-flop 31 to ensure that the flip-flop is in its "off" state prior to the reading and coding of the next three binary bits which are then represented by the passage of two more pulses to flip-flop 31. The output of flip-flop 31 is supplied to a −cosine generator 32 which is gated or turned on for the duration of each "on" pulse from flip-flop 31. The parameters of −cosine generator 32 are chosen so that the frequency of the signals generated therein are such that only one cycle of a −cosine wave will pass to the output during the period of time that generator 32 is turned on by the pulse from flip-flop 31. The sequence of single cycles of −cosine waves from the output of −cosine generator 32 is supplied to a transmitter 33 which may be of any suitable type, radio or line. Since one MPM pulse always occurs in each time interval of 2T seconds, the nature of the MPM signal stream is essentially A.-C. Therefore, if the signal rate is properly chosen, MPM signals may also be transmitted directly over conventional telephone lines if desired.

The various timing pulses required to operate the portion of the circuit of FIG. 4 thus far described are supplied from a master oscillator 35 which generates a signal having a frequency of $16f$. This signal is supplied to a pulse generator 36 which supplies shift pulses at a frequency $16f$ to shift-register 29. The output pulses of pulse generator 36 are also supplied to a frequency dividing circuit comprised of four complementary flip-flops 38, 39, 40, and 41 connected in series. The output of flip-flop 40 is a series of pulses at a frequency $2f$ which are supplied to a one-short multivibrator 42 which supplies the pulses or "1's" which are stored in the first stage of shift-register 29. Flip-flop 41 supplies pulses at a frequency of $f$ to delay multivibrators 43 and 44. Multivibrator 43 supplies the "clear" pulses to flip-flops 17, 18, and 19, and multivibrator 44 supplies the "read" pulses to gates 14, 15, 16 and the "reset" pulses to flip-flop 31.

The output of master oscillator 35 is also supplied to a frequency divider 45, the output of which is a signal having a frequency $3f$. This signal is applied to a pulse generator 46, which supplied "shift" pulses at frequency $3f$ to shift registers 12 and 13. These pulses are also supplied to a further frequency divider 47, the output of which is used to trigger the advance and reading of each line of information in tape reader 11 at a frequency of $3f/5$.

Figure 5:
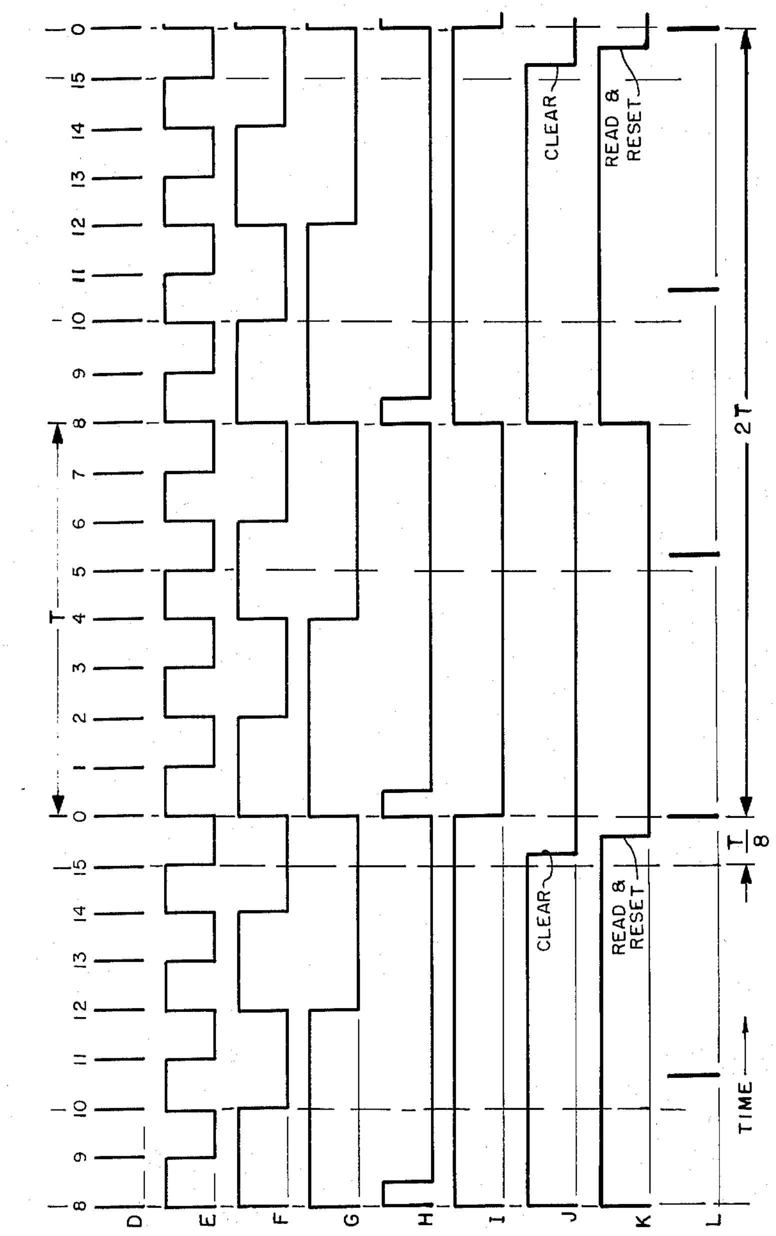
FIG. 5 shows waveforms useful in explaining the operation of the circuit of FIG. 4.

The operation of the signal encoder of FIG. 4 will now be described in conjunction with the waveform diagrams of FIGS. 2, 3, and 5. In FIG. 5 the relationship of the various timing pulses used in the encoder circuit of FIG. 4 to one another is shown. Curve D represents the output of pulse generator 36 at a frequency of $16f$. These pulses are supplied every $T/8$ seconds as shift pulses for shift register 29. Curves E, F, and G represent the respective outputs of complementary flip-flops 38, 39 and 40 which act as frequency dividers, each one dividing the pulse frequency applied to it by one-half. The output of flip-flop 40 (curve G) is a train of pulses at a frequency $2f$, and these pulses are used to trigger one-shot multivibrator 42. The output of multivibrator 42 is shown in curve H and it is used to supply the "1" pulses stored in shift register 29. Curve I represents the output of complementary flip-flop 41 having a frequency $f$ which is applied in parallel to trigger delay multivibrators 43 and 44, the outputs of which are represented by curves J and K, respectively. The pulses shown in curve L represent the shift pulses at a frequency $3f$ which are supplied to shift registers 12 and 13 from pulse generator 46. It is to be noted that the basic 2T timing period has been subdivided into sixteen equal time intervals of duration $T/8$ for the purpose of the ensuing discussion.

While the binary information for the signal encoder may be obtained from a number of different sources, it has been shown in FIG. 4 as emanating from a standard five-baud teletype tape reader 11. Tape reader 11 receives "read" and "advance" pulses at a frequency of $3f/5$ from frequency divider 47. Each time one of these "read" pulses is applied to tape reader 11, the information stored on the line of tape then in position is supplied in parallel to shift register 12 thereby filling all five stages simultaneously. The tape is then advanced to the next line in a manner well-known in the art. In the meantime the "shift" pulses of curve L in FIG. 5 are applied to shift register 12 from pulse generator 46 at a frequency of $3f$.

These pulses cause the five bits of binary information stored in register 12 to be supplied in series to shift register 13. After the fifth bit is shifted out of register 12, the register is clear and the next "read" pulse is applied to tape reader 11 to cause register 12 to be filled with the next line of information stored on the tape The sequence outlined above is then repeated for each line of five bits with the filling of register 12 taking place between the fifth and sixth "shift" pulses, so that the output of shift register 12 is an uninterrupted series binary signal train. For the purpose of the remaining explanation of the operation of the encoder system, assume that the binary signal train formed in this manner takes the form of curve A of FIG. 3.

This binary sequency shown in curve A of FIG. 3 is supplied to three-stage shift register 13 which is shifted at the same rate as shift register 12 by shift pulses from pulse generator 46. The filling of shift register 13 commences at time zero as shown in FIG. 5. The third binary bit necessary to complete the filling of all three stages is supplied to register 13 shortly before the eleventh time interval. Just after the fifteenth interval a "clear" pulse (curve J) is supplied to flip-flops 17, 18, 19 from delay multivibrator 43. The circuit is constructed so that these flip-flops are responsive only to the negative slope of the output pulse from multivibrator 43. This "clear" pulse sets flip-flops 17, 18, 19 to "0." Immediately following the "clear" pulse, a "read" pulse (curve K) is applied to gates 14, 15, 16 from delay multivibrator 44. Again, through the use of circuitry well known in the art, only the negative slope of the output pulse from multivibrator 44 acts to supply an enabling "read" pulse to gates 14, 15, 16. These gates will have an output pulse upon application of this "read" pulse only if the stage of shift register 13 to which they are connected contains a binary "1." Thus, for the sequence shown in curve A of FIG. 3, the first three binary bits are "101" which means that gates 14 and 16 will pass the first "read" pulse and gate 15 will have no output since it is connected to the stage of shift register 13 which contains a "0." The pulses passed by gates 14 and 16 will cause respective flip-flops 17 and 19 to be set to their "1" state. Flip-flop 18 will remain set to "0" since no pulse is passed by gate 15. In this manner the first three binary bits "101" are now stored in flip-flops 17, 18, 19 which will remain set to "101" until the next "clear" pulse is applied to them after the next fifteenth interval which occurs 2T seconds later. In the meantime beginning with the next zero time interval, the next three binary bits are stored in shift register 13 preparatory to the next "read" pulse and so on for each three binary bits in the input signal stream.

The two output lines representing "0" and "1" from each of flip-flops 17, 18, 19 are connected to conventional diode matrix 20 having eight outputs corresponding to the eight possible combinations of three binary bits. Assume, for the purpose of this illustration, that when one of flip-flops 17, 18, 19 is set to either of its two possible outputs, the output to which it is set is "high" or at a positive potential with respect to ground and that its other output line is "low" or at ground potential. Thus, for the binary sequence "101," the "1" output lines of flip-flops 17 and 19 and the "0" output line of flip-flop 18 have a positive potential. As stated previously, each horizontal line of diode matrix 20 comprises a three-variable or three-input AND gate. The operation of such gates is well-known and will not be discussed in detail here. There will be a positive output from any one of these lines only if all three diodes in that line receive a "high" or positive bias potential from flip-flops 17, 18, 19. For the binary sequence "101," only the line from matrix 20 connected to AND gate 26 will have a positive output potential. All the other lines will have a low or negative output.

The encoding of the binary information obtained from matrix 20 into MPM signal pulses is initiated by commutating gates 21 to 28 in sequential order at intervals of $T/8$. Referring again to FIG. 5 it is seen that at time interval zero a "1" pulse (curve H) is supplied to the first stage of shift register 29 all stages of which previously contained "0." This "1" pulse is shifted through each stage of the register by shift pulses (curve D) from pulse generator 36, these shift pulses occurring every $T/8$ seconds. There will be an output enabling pulse from a stage in shift register 29 only if that stage contains a "1." Thus, it is seen that enabling pulses are supplied in sequence to gates 21 to 28 at intervals of $T/8$ seconds as the "1" is stepped through shift register 29. This means that gate 21 receives an enabling pulse during the first timing period 2T, gate 26 will pass an output pulse $5T/8$ seconds later, and so on with gate 28 receiving an enabling pulse $7T/8$ seconds after gate 21. Gates 21 to 28 will pass this pulse only if they also receive a "high" bias potential from matrix 20. Therefore, during the first timing period 2T, gate 26 will pass an output pulse $5T/8$ seconds after the start of the interval to signify the binary sequence "101." After the first "1" is shifted out of the final (eighth) stage of shift register 29, T seconds have elapsed, and another "1" is stored in the first stage of register 29 (see curve H) and is stepped through the register in the same manner as the first "1" stored therein. When the "1" is in the sixth stage, gate 26 again will pass a pulse since the condition of matrix 20 has not been changed. It should be noted that the first pulse from gate 26 occurred $5T/8$ seconds after the start of the sequence and that the second pulse occurred exactly T seconds after the first.

These two output pulses are supplied through signal combiner 30 to complementary flip-flop 31. Signal combiner 30 is merely an isolating circuit or an OR gate to pass the pulse from gates 21 through 28 to flip-flop 31. At the same time that the "read" pulse is applied to gates 14, 15, 16, a "reset" pulse is also applied to flip-flop 31 to turn it "off." Then when the first output pulse from gate 26 is applied to flip-flop 31, the state of flip-flop 31 is changed to "on," i.e., the output rises from a low state to a relatively higher voltage state. When the second output pulse from gate 26 is applied to flip-flop 31 T seconds later, the state of the flip-flop is changed back to "off." This action results in an output pulse having a duration of T seconds being supplied to —cosine generator 32 which is gated on for the duration of this pulse to pass one cycle of a —cosine wave to transmitter 33. The details concerning the formation of this —cosine wave will be given in a discussion of FIG. 6. Due to the commutation of gates 21 to 28 by shift register 29, complementary flip-flop 31 does not initiate energization of —cosine generator 32 until $5T/8$ seconds after the start of the first timing period 2T. This results in the generation of a —cosine wave having the relative position within the 2T timing period as shown in the curve of FIG. 1 identified with the binary designation "101." This first MPM pulse is also shown in curve B of FIG. 3 as the first pulse in a train of MPM pulses which correspond to the train of binary pulses in curve A of FIG. 3.

During the time that this first MPM pulse is being formed in the manner discussed above, the next three binary bits "100" shown in curve A of FIG. 3 are being stored in shift register 13. After the third bit is stored and just before the end of the first 2T timing period, the next "clear" pulse (curve J) is applied to flip-flops 17, 18, 19 to reset them all to "0." Then the next "read" pulse (curve K) is applied to gates 14, 15, 16 and a "reset" pulse (curve K) is applied to complementary flip-flop 31. This flip-flop should already be in its "off" state due to the action of the second pulse from signal combiner 30, but the "reset" pulse is applied to ensure that flip-flop 31 is turned "off" in order to prevent any possible error from being carried over from the previous encoding operation. With the application of this second "read" pulse, flip-flop 17 will be set to "1" and flip-flops 18 and 19 will remain set to "0." This results in a high bias potential being applied to gate 25 from matrix 20. Shift register 29 then commutates gates 21 to 28 in the manner previously discussed for the first timing period 2T, which results in the application of the first output pulse from gate 25 to flip-flop 31 $4T/8$ seconds after the start of the second timing period 2T. The —cosine wave generated during this second timing period then occupies the relative position within the timing period 2T as shown in the curve marked "100" in FIG. 1. This same pulse is also shown in curve B of FIG. 3 as the second MPM pulse under the three binary pulses "100" in curve A which it represents.

In a like manner, the following sequence of binary pulses in curve A in groups of three, is encoded to form the remainder of the MPM signal shown in curve B of FIG. 3.

It should be emphasized that while the encoder has been discussed in conjunction with binary information obtained from a five-baud teletype tape reader, the binary signal stream may be obtained from any suitable source. For example, if a three-baud tape reader were employed, its output could be applied in parallel directly to gates 14, 15, 16 thereby eliminating shift registers 12 and 13, or if the binary information is already in serial form, it could be applied to shift register 13, and tape reader 11 and shift register 12 could be eliminated from the circuit.

A ring counter could also be substituted for shift register 29, thereby eliminating the need for supplying the "1" pulse which is stored in shift register 29 every T seconds. However, if an error occurred in the position of the pulse being shifted through such a ring counter or if an error pulse were introduced in the counter, these errors would be continuously repeated thereby completely disrupting the operation of the system. The use of a shift register 29 eliminates this chance of propagating errors since any error which may occur in the register is cleared out every T seconds.

Figure 6:
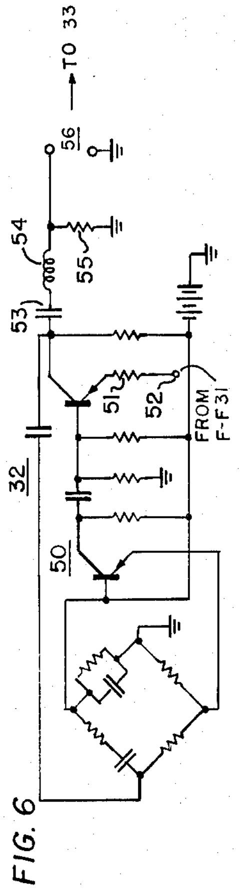
FIG. 6 is a detailed circuit diagram of a portion of the circuit of FIG. 4.

FIG. 6 shows a detailed circuit diagram of —cosine generator 32. The basic generator is a conventional Wein-bridge oscillator 50 such as that shown on page 180 of the Department of the Army Technical Manual TM 11–690, "Basic Theory and Application of Transistors," U.S. Government Printing Office, 1959. Oscillator 50 has been modified so that it is normally biased to cutoff. This is accomplished by connecting emitter resistor 51 to the output of flip-flop 31 instead of to ground as is normally done for free-running operation. When flip-flop 31 is in its "off" state, it applies a negative potential with respect to ground to terminal 52 thereby cutting-off operation of the oscillator. When flip-flop 31 is turned "on," the potential at terminal 52 is raised to ground to initiate oscillation of oscillator 50. The frequency of oscillator 50 is chosen so that only one cycle will occur during T seconds, which is the length of each "on" pulse from flip-flop 31. Thus only a single cycle will pass before the oscillator is again biased to cutoff by the action of flip-flop 31. Since the output of a Wein-bridge oscillator is a sine wave, it is supplied through a coupling capacitor 53 to an inductor 54 and resistor 55 connected in series. The impedance of resistance 55 is small in comparison to that of inductor 54. The action of inductance 54 causes the voltage of the signal across resistor 55 to lag 90° in phase from the sine wave output of oscillator 50 to thereby produce the desired —cosine waveform across resistor 55. This —cosine signal is then supplied to transmitter 33 through output terminals 56. It should be noted that a single cycle of a —cosine wave having a period of T seconds is generated for each "on" pulse from flip-flop 31 and that these —cosine pulses are time-quantized to one of eight distance positions in the 2T timing periods in accordance with the MPM code which has been established.

The formation of the —cosine pulses could also be accomplished by generating a continuous wave which is supplied through a series of fixed delays to give the eight signals represented by the vector diagram of FIG. 2. The particular signal selected would then be gated for just one cycle and the start and finish of this cycle would be coincident with successive negative peaks of the wave. The gated wave would then be a —cosine pulse or bit as obtained by the system of FIG. 6. However, the use of the —cosine generator of FIG. 6 in the circuit of FIG. 4, is believed to be more reliable and accurate because of its inherently simpler circuit and operation.

At the receiver, the MPM signal stream is decoded by the system shown in FIGS. 7A and 7B. The incoming signal stream is first passed through a low-pass filter and shaping amplifier circuit 58. Since the nature of the MPM signal stream is such that the —cosine bits are rich in the fundamental frequency, and depend little on harmonics, it is possible to obtain excellent noise discrimination in filter 58. After passing through filter and shaping amplifier circuit 58, the MPM signal is applied in parallel to a peak detector 60 and four synchronous detectors 61 to 64. Also respectively applied to detectors 61 to 64 are four orthogonal decoding signals derived from a local signal generator 59. Detector 61 is supplied with a continuous —cosine wave from generator 61, detector 62 with a —sine wave, detector 63 with a +cosine wave and detector 64 with a +sine wave. The output of synchronous detectors 61 to 64 are supplied through respective low-pass filters 65 to 68 to threshold discriminators 69 to 72. Threshold discrimintors 69 to 72 operate to prevent false signals, due to noise, from being applied to the logic net and causing errors. This is accomplished by rejecting all signals that fall below a specified amplitude and do not possess a specified time duration. The output of peak detector 60 is supplied to the bias circuits of discriminators 69 to 72 to control the level of the cut-off amplitude. This operation will be more fully described in the subsequent detailed description of the operation of FIGS. 7A and 7B. The output of discriminator 69 is supplied in parallel to a delay line 73, pulse stretchers 80*a* and 80*b*, and an AND gate 88. In a like manner the output of discriminator 70 is supplied to a delay line 75, pulse stretchers 74*a* and 74*b*, and an AND gate 82; the output of discriminator 71 to a delay line 77, pulse stretchers 76*a* and 76*b*, and an AND gate 84; and the output of discriminator 72 to a delay line 79, pulse stretchers 78*a* and 78*b*, and an AND gate 86.

The logic necessary to convert the pulses from the pulse shaping circuits 73 to 80 into a form from which the original binary signal applied to the input of the encoder of FIG. 4 may be reconstructed is provided by the alternating INHIBIT and AND gates 81 to 88. Each delay line 73, 75, 77, 79 has a delay of $\Delta t$ and supplies output pulses to one INHIBIT gate and one AND gate witd the output of delay line 73 being applied to gates 81 and 82; the output of delay line 75 being applied to gates 83 and 84; the output of delay line 77 being applied to gates 85 and 86; and the output of delay line 79 being applied to gates 87 and 88. The "control" or "inhibit" pulses for INHIBIT gate 81 are obtained from the outputs of pulse stretchers 74*a* and 78*b*; the "control" pulses for INHIBIT gate 83 are supplied by pulse stretchers 76*a* and 80*b*; "control" pulses for INHIBIT gate 85 are supplied by pulse stretchers 74*b* and 78*a*; and "control" pulses for INHIBIT gate 87 are supplied by pulse stretchers 76*b* and 80*a*. As will be more readily understood in the subsequent description of the operation of FIGS. 7A and 7B, the outputs of gates 81 to 88 represent the eight respective three-bit binary groups "000" to "111" from which the MPM signal stream was formed.

Each output of gates 81 to 88 is connected to one of the two inputs of each of three flip-flops 89, 90 and 91 shown in FIG. 7B. The two inputs of flip-flops 89, 90 and 91 represent binary "0" and "1"; and the connections to gates 81 to 88 are such that an output pulse from gate 81 is applied to the "0" input of all three flip-flops to set them to "000"; an output pulse from gate 82 is applied to the "0" inputs of flip-flops 89 and 90 and to the "1" input of flip-flop 91 to set them to "001," respectively. A similar analysis will show that the respective outputs of gates 83 to 88 set flip-flops 89 to 91 to designate the binary sequences "010" to "111." Three AND gates 92, 93 and 94 are connected to the "1" outputs of flip-flops 89, 90 and 91, respectively. Enabling pulses for AND gates 92 to 94 are supplied through terminal 95 from a suitable clock circuit (not shown). These enabling pulses cause the information stored in flip-flops 89 to 91 to be read and stored in parallel in a three stage shift register 96. The binary bits stored in shift register 96 are then supplied in series to a five-stage shift register 97 the stages of which are read in parallel by the application of a "read" pulse from a terminal 104 to AND gates 99 to 103 each time the register is filled with a different group of five successive binary bits from the output of register 96. AND gates 99 to 103 will have output pulses only if the stages of shift register 97 to which they are connected contain "1's." The outputs of gates 99 to 103 may be supplied to any suitable load, such as a conventional teletype tape punch 105. The clock circuit for supplying "read" pulses to terminals 95 and 104 and "shift" pulses to shift registers 96 and 97 may be similar to the clock circuit of FIG. 4 and for that reason such clock circuit has not been shown in FIGS. 7A and 7B.

In order to ensure proper operation of the MPM signal decoder shown in FIGS. 7A and 7B, it is necessary to synchronize the local signal generator 59 with the incoming MPM signal stream. At the beginning of a message this is accomplished by transmitting all "0's" in the MPM signal which results in a pulse at the beginning of each timing period 2T. These initial pulses are supplied from filter 58 through terminals 106 and 107 of a single-pole double-throw switch 109 to signal generator 59 to synchronize the frequency of signal generator 59 with the input MPM signal train. After this initial synchronization, the connection with terminal 107 is broken and connection to terminal 108 of switch 109 is made. This latter connection will remain for the duration of the message resulting in the derivation of synchronizing pulses from a combining circuit 120 which receives input pulses from gate 88 and delay lines 112 to 118 connected to the outputs of gates 81 to 87, respectively. This formation of synchronizing pulses will be more fully described in the subsequent description of the operation of the circuit shown in FIGS. 7A and 7B.

The operation of the MPM decoder circuit shown in FIGS. 7A and 7B will be discussed generally in conjunction with the information given in FIGS. 1 and 2 and then in more detail in connection with the signal streams shown in FIG. 3. The input MPM signal is first passed through low-pass filter and shaping amplifying circuit 58. The purpose of this circuit is to reshape and amplify the input MPM signals to the correct form in order to eliminate distortion due to previous non-linearity, noise, clipping, etc. This shaping function is readily accomplished since the basic −cosine bit structure is known. As previously stated, the use of −cosine pulses also results in a signal stream having low harmonic content which enables filter 58 to be designed to give excellent noise discrimination. In order to further improve the signal-to-noise discrimination, it is also possible to clamp the incoming signal to zero during the $T/8$ seconds just prior to the end of each timing period 2T. This is possible because no MPM pulse or signal ever occurs during this interval as is shown in FIG. 1. One method by which this clamping action may be accomplished is to incorporate a squelch circuit in filter 58. However, such techniques are well-known and need not be discussed in detail here.

After the MPM signal has been restored to its original form by filter and shaping amplifier circuit 58, it is applied in parallel to the four synchronous detectors 61 to 64. It should be noted at this time that the time quantized encoding of the −cosine bits is equivalent to orthogonal encoding of the −cosine signal on a single cycle basis. Each $T/8$ delay is equivalent to a 45° phase delay, and this relationship is shown in FIGS. 1 and 2. Also respectively applied to the synchronous detectors 61 to 64 are the four orthogonal decoding signals, $-\cos \omega t$, $-\sin \omega t$, $+\cos \omega t$, $+\sin \omega t$, that are derived from local signal generator 59 which is synchronized with the incoming MPM signal in a manner to be described hereinafter. The decoding of the MPM signal is accomplished by establishing phase correlations in detectors 61 to 64 between the orthogonally (time-quantized) encoded MPM signals and the above locally generated signals. The MPM signal amplitude is not critical since it is only necessary to establish a signal presence, and no frequency correlation is necessary since the signals involved are all of a single frequency. Only one of the eight pulse positions of FIG. 1 or the eight vector positions of FIG. 2 is occupied for each timing period 2T of the incoming signal. This means that if the incoming MPM bit is in the first position of FIG. 1 or encoded $-\cos \omega t$, it will correlate positively with only the local $-\cos \omega t$ signal in synchronous detector 61. The other locally generated signals are either in quadrature, and therefore will not effect correlation, or in the case of the $\cos \omega t$ signal will produce negative correlation and can be cut off in the synchronous detector due to biasing. If the incoming MPM bit is encoded $-\cos \omega t - \sin \omega t$, it will then produce two correlation components; one with the local $-\cos \omega t$ signal in synchronous detector 61 and one with the $-\sin \omega t$ signal in synchronous detector 62. Similar reasoning can be applied to the other six encoded positions to show that MPM pulses encoded $-\sin \omega t$, $\cos \omega t$, and $\sin \omega t$ will correlate in detectors 62, 63, and 64, respectively, and that MPM pulses encoded $-\sin \omega t + \cos \omega t$, $\cos \omega t$, $+\sin \omega t$, and $\sin \omega t$, $-\cos \omega t$ will correlate in detectors 62 and 63, 63 and 64, and 61 and 64, respectively.

The above-described correlation technique is realized by employing pentodes in synchronous detectors 61 to 64 in the "product demodulator" type of circuit generally used in color television receivers to recover and deliver the video frequency chrominance components. The operation and reliability of this circuit is well established.

The outputs of synchronous detectors 61 to 64 are supplied through low-pass filters 65 to 68 to eliminate the harmonic components which may be present in the output pulses. Since the output pulses of detectors 61 to 64 are of −cosine configuration, it is also possible to pass them through a series of differentiation circuits to eliminate unwanted low frequency components from the signal. This differentiation will merely change ±cosine to ±sine waves and vice-versa, but pulses of other shapes will soon disappear with successive differentiation. In addition to these techniques it is also possible to add a squelch circuit to filters 65 to 68 which is effective during the last $T/8$ seconds before the end of each 2T period to prevent ringing of the filters.

After passing through filters 65 to 68, the output pulses from detectors 61 to 64 are supplied to respective threshold discriminator circuits 69 to 72 which will pass only pulses having an amplitude above a predetermined minimum amount. This cutoff level is determined from a knowledge of the operation of detectors 61 to 64. That is, assume that when an incoming MPM pulse is encoded so that it correlates exactly with one of the four local signals in one of the detectors, the output of that detector is a pulse of unity voltage. Now if an incoming MPM pulse is encoded in one of the other four positions, i.e. i.e., $-\cos \omega t - \sin \omega t$, $\cos \omega t - \sin \omega t$, $\cos \omega t + \sin \omega t$, or $\sin \omega t - \cos \omega t$, it will correlate in two detectors as previously discussed. However, since the correlation is not exact, the output pulses from each detector are approximately 0.7 of unity. This operation is inherent with the type of synchronous detector discussed above. It should be noted that for both the above situations, the remaining two or three detectors, as the case may be, may also have output pulses, but they will be of a magnitude considerably below the above 0.7 level. Therefore, threshold discriminators 69 to 72 are D.-C. biased to cutoff all signals falling below this 0.7 level. Since the amplitude of the input MPM signal stream may vary due to transmission path variations between the transmitter and receiver, some means must be provided for changing the bias level and therefore the cutoff level of discriminators 69 to 72 in response to input amplitude variations. This is accomplished by applying the input signal to peak detector 60, the D.-C. output level of which will be in proportion to the instantaneous amplitude of the input MPM signal. This D.-C. signal is then applied to the bias circuits of threshold discriminators 69 to 72 to vary the D.-C. bias thereof. In this manner the cutoff level of the discriminators is automatically maintained just below the 0.7 level.

The nature of detector circuits 61 to 64 in detecting signals having components which cause correlation in two detectors such as $-\cos \omega t - \sin \omega t$ (representing binary "001") which correlates in detectors 61 and 62, is such that one synchronous detector will have an output pulse which occurs $\Delta t$ seconds before the output of the other detector. With the signals from local signal generator 59 applied as shown in the drawing, the detector with the lower reference number of the two will have the earlier output pulse except in the case of input $\sin \omega t - \cos \omega t$ which will correlate first in detector 64 then in detector 61. This situation is illustrated in line P of FIG. 8. The tall, heavy vertical lines marked "000," "010," "100," and "110" which occur at intervals of $T/4$ seconds represent the outputs of synchronous detectors 61 to 64, respectively, for those four MPM signals which correlate in only one detector. The four MPM pulses representing binary 001, 011, 101 and 111 will each correlate in two detectors $\Delta t$ seconds apart. In FIG. 8 line P these pulses are represented by the pairs of short solid vertical lines which are 0.7 as long as the lines representing the MPM signals $-\cos \omega t$, $-\sin \omega t$, $\cos \omega t$, and $\sin \omega t$. The dotted vertical line between each of these pairs is designated with the binary information they represent. For example, if the incoming MPM bit in a given timing period 2T is encoded $-\cos \omega t - \sin \omega t$ (binary 001) it will correlate first in synchronous detector 61 to form the first output pulse of the pair "001" as shown in line P; then $\Delta t$ seconds later it will correlate in synchronous detector 62 to form the second output pulse of the pair "001." In a like manner an MPM pulse encoded $\cos \omega t - \sin \omega t$ (binary 011) will correlate first in detector 62, then in detector 63, a pulse encoded $\cos \omega t + \sin \omega t$ 64, and a pulse encoded $\sin \omega t - \cos \omega t$ (111) will correlate first in detector 64, then in detector 61. These relative bit is encoded $-\cos \omega t$ (binary "000"), it will correlate pulse positions will also be the same for the output pulses from threshold discriminators 69 to 72.

The decoding of the pulses present at the four outputs of discriminators 69 to 72 into pulses representing the eight possible MPM positions is achieved by means of INHIBIT and AND gates 81 to 88. The outputs of threshold discriminators 69 to 72 are supplied to four similar circuits each containing one INHIBIT gate and one AND gate. The operation concerning gates 81 and 82 will be described in detail with the understanding that a similar operation occurs for the pairs of gates 83 and 84, 85 and 86, and 87 and 88. The output pulses from discriminator 69 are delayed $\Delta t$ seconds by delay line 73 and are supplied to INHIBIT gate 81 and AND gate 82. The control or inhibit pulses for INHIBIT gate 81 are supplied from the output of pulse stretcher 78*b* responsive to the output of discriminator 72 and from the output of pulse stretcher 74*a* responsive to the output of discriminator 70 which also has its output directly connected to AND gate 82. In a like manner control pulses for INHIBIT gate 83 are supplied from the output of pulse stretcher 80*b* responsive to the output of discriminator 69 and from the output of pulse stretcher 76*a* responsive to the output of discriminator 71. If the incoming MPM bit is encoded $-\cos \omega t$ (binary "000"), it will correlate only in detector 61 causing an output only in discriminator 69. This pulse will be delayed $\Delta t$ second by delay 73 and will be passed by INHIBIT gate 81 since no control pulse is supplied to gate 81 due to the fact that detectors 62 and 64 and therefore discriminators 70 and 72 are not activated by $-\cos \omega t$ input pulses. Although the delayed pulse from discriminator 69 is also supplied to AND gate 82, there will be no output from this gate since no coinciding pulse is present from discriminator 70. Since none of the other threshold discriminators has an output from $-\cos \omega t$ signal input pulses, only INHIBIT gate 81 passes an output pulse during the 2T timing period in which the $-\cos \omega t$ input pulse occurs.

Now is the incoming MPM pulse is endeded $-\cos \omega t - \sin \omega t$ (binary 001) it will correlate in synchronous detectors 61 and 62 causing output pulses to appear from discriminators 69 and 70. The output pulse from discriminator 69 passes through delay line 73 and is applied to gates 81 and 82 as in the above example. However, this delayed pulse will not pass through INHIBIT gate 81 since a control pulse is also applied to gate 81 from the undelayed output of discriminator 70 which passes through pulse stretcher 74*a*. Pulse stretcher 74*a* lengthens the pulses which are supplied to it from discriminator 70 so that they completely overlap the output pulses from delay line 73. This is done to ensure that no output pulse will pass from INHIBIT gate 81 when pulses are present from both discriminators 69 and 70. The output of discriminator 70 is applied directly to AND gate 82 and through delay 75 to INHIBIT gate 83. This delayed pulse applied to INHIBIT gate 83 will not be passed since a control pulse is also applied to gate 83 from the output of discriminator 69 which is passed through pulse stretcher 80*b*. The characteristics of pulse stretcher 80*b* are chosen so that its output pulses completely overlap in time the output pulses from delay line 75. The undelayed pulse from discriminator 70 will coincide with the delayed pulse from discriminator 69 in AND gate 82. This coincidence causes an output pulse only from gate 82. The delay $\Delta t$ of delay line 73 is chosen to cause this coincidence and this relationship is shown in curves P and Q of FIG. 8. Curve Q shows the relative times that the output pulses from gates 81 to 88 will occur during any given 2T timing period. Of course, it is to be understood that these pulses will be of approximately T seconds duration.

A similar analysis of each of the other pairs of INHIBIT and AND gates will show that whenever an input MPM bit correlates with only one detector, the INHIBIT gate associated with that particular detector will pass an output pulse, and that whenever an input MPM pulse correlates in two detectors, the AND gate associated with those two detectors will pass an output pulse to its output line.

The pulses from each of gates 81 to 88 are applied to one of the two inputs of each of the three flip-flops 89 to 91 to set the flip-flops to the particular binary code represented by these output pulses. For example, an output pulse from gate 81 represents binary "000" and is applied to the "0" input of all three flip-flops 89 to 91 to set them to "0." An output pulse from gate 82 represents binary "001" and is applied to the "0" inputs of flip-flops 89 and 90 and to the "1" input of flip-flop 91 thus setting them to binary "001," respectively. In a like manner, the outputs of the remaining gates 83 to 88 are connected to the inputs of flip-flops 89 to 91 to set them to binary "010" through "111," respectively. Just prior to the end of each timing period 2T at the same relative time "read" pulse K is applied to gates 14, 15, 16 in the encoder, a "read" pulse is applied to AND gates 92 to 94 which are connected to the "1" outputs of flip-flops 89 to 91. The outputs of gates 92 to 94 are fed in parallel to three stage shift register 96, all stages of which previously have been set to "0." If a "1" occurs in any of flip-flops 89 to 91, the AND gates connected thereto will pass a pulse to cause a "1" to be stored in the respective stages of shift-register 96. The information stored in shift-register 96 is supplied serially to five stage shift register 97. The shift pulses for shift-registers 96 and 97 are supplied at the same rate as the shift pulses of curve L supplied to registers 12 and 13 in the encoder. After five binary bits are stored in shift register 97 a "read" pulse is applied to AND gates 99 to 103 to read in parallel the information stored in register 97. The outputs of AND gates 99 to 103 are connected to a suitable load such as conventional tape punch 105. The binary information stored on the tape in tape punch 105 will be a reproduction of the binary information supplied from tape reader 11 to the MPM encoder of FIG. 4.

FIG. 9 shows a detailed circuit diagram of a preferred embodiment of signal generator 59. A suitable stable oscillator 125 which may be a transistor Wein-bridge oscillator supplies a sine wave signal to the input terminals of a bridge circuit 126 having variable resistors 127 in two opposing arms and capacitors 128 in the other two opposing arms. Resistors 127 are then adjusted until the signals appearing at the output terminals 129 and 130 are 90° out of phase. These output signals are then supplied to the grids of a pair of balanced triodes 131 and 132. As is well known, the signals appearing at the cathodes of triodes 131 and 132 will be in phase with the input signals applied to the grids, and the signals appearing at the anodes of tubes 131 and 132 will be 180° out of phase with the respective cathode signals. Since the input grid signals are 90° out of phase, outputs taken from the anodes and cathodes of tubes 131 and 132 will give the four orthogonal decoding signals which are supplied to synchronous detectors 61 to 64. The circuit shown in FIG. 9 is but one of several conventional phase-splitting circuits which may be employed to provide the locally generated decoding signals.

From the foregoing description of the operation of the MPM decoder of FIGS. 7A and 7B, it is evident that the MPM decoder must be synchronized with the MPM encoder of FIG. 4. No special techniques beyond the skill of the art are required to achieve this synchronization, and one means will be discussed hereinafter. At the start of any MPM signal transmission a sequence of all "0's" will be transmitted. This is conveyed by a sequence of MPM pulses encoded $-\cos \omega t$ which have a duration of T seconds and which occur during the first T seconds of each timing period 2T (see FIG. 1). This pulse sequence is supplied through switch terminals 106 and 107 to oscillator 125 (FIG. 9) in signal generator 59. These pulses are then applied to the oscillator to synchronize it in a manner well-known in the art. With oscillator 125 thus synchronized with the input signal, it is then adjusted until the $-\cos \omega t$ signal appearing at the anode of tube 132 coincides with the input MPM $-\cos \omega t$ bit in synchronous detector 61. Once this adjustment has been made for a given message, it need not be repeated. After synchronization of the system is made in the above manner, terminals 106 and 108 of switch 109 are connected as shown in FIG. 7A for the duration of the message, and the synchronizing pulses are derived from the outputs of gates 81 to 88. Since the input MPM — pulses, and therefore the respective output pulses of gates 81 to 88, may occupy one of eight different times locations within each timing period 2T, it is necessary to use delay lines 112 to 118, each having different delay length, to delay the outputs of the various gates 81 to 87 by different amounts so that one synchronizing pulse will occur at the output of combiner 120 every 2T seconds. The delay necessary for each of delay lines 112 to 119 to impart to the output of the respective gate to which it is connected may be readily ascertained by reference to FIG. 8, curve Q. Thus, delay line 112 must impart a delay of $3T/4+\alpha$ seconds to the output pulses from gate 81; delay 113 must be $3T/4$ seconds long; delay 114 is $T/2+\alpha$ seconds; delay 115 is $T/2$ seconds; delay 116 is $T/4+\alpha$ seconds; delay 117 is $T/4$ seconds; and delay 118 is $\alpha$ seconds long. Pulses from the output of gate 88 are passed undelayed to combiner 120. The action of these varying delay lines is such that regardless of where in a timing period 2T an input MPM pulse may occur, the pulse will be applied to combiner 120 as if it always occurred in the eight position encoded $\sin \omega t - \cos \omega t$ and was passed by gate 88. Variable delay 121 is adjusted to compensate for the inherent circuit delays in the MPM decoder and to cause the stream of output pulses to coincide with the initial series of $-\cos \omega t$ MPM pulses which are applied directly to oscillator 125 at the beginning of the message. The output pulse stream from delay line 121 will then contain a pulse at the beginning of each timing period 2T for maintaining synchronization of oscillator 125 for the duration of the message.

In order to more fully appreciate the above-described decoder operation, assume that the MPM signal stream shown in curve B of FIG. 3 is applied to the decoder of FIGS. 7A and 7B. Prior to receipt of the signal of curve B, the decoder is synchronized in the manner described above. Then in the first timing period 2T an MPM —cosine pulse is transmitted $5T/8$ seconds after the start of the period as shown in curve B. This is equivalent to orthogonal encoding of a single cycle of the —cosine wave as $\cos \omega t + \sin \omega t$ which represents binary "101" as shown in FIG. 1. This pulse will then correlate in synchronous detectors 63 and 64 causing output pulses to occur in threshold discriminators 71 and 72 with the pulse from discriminator 71 occurring $\Delta t$ seconds before that from discriminator 72. The pulse from discriminator 71 is delayed $\Delta t$ seconds in delay line 77 and coincides with the undelayed output pulse from discriminator 72 to cause an output pulse from AND gate 86 which sets flip-flops 89 and 91 to "1" and flip-flop 90 to "0" to store the binary number "101" therein. No pulse will be passed in INHIBIT gate 85 since a control pulse is also applied to gate 85 from discriminator 72 through pulse stretcher 78*a*. Likewise, no pulse will be passed by INHIBIT gate 87 since it also receives a control pulse from the output of discriminator 71 through pulse stretcher 76*b*. During the last $T/8$ seconds of the 2T period a "read" pulse is applied to gates 92 to 94 to store the binary information from flip-flops 89 to 91 in shift register 96 from which the information is supplied to the load as previously described. The output pulse from gate 86 is also delayed $T/4$ seconds by delay line 117 and passed from combiner 120 through delay line 121 where it is delayed to the beginning of the second timing period 2T to act as a synchronizing pulse for oscillator 125 in signal generator 59. In the second timing period 2T of curve B, a —cosine pulse is transmitted $4T/8$ seconds after the start of the period. This is equivalent to orthogonal encoding of the wave as $+\cos \omega t$ which represents binary "100" as shown in FIG. 1. This pulse will correlate only in synchronous detector 63 causing an output pulse from discriminator 71, which after being delayed $\Delta t$ seconds in delay line 77 will be passed by INHIBIT gate 85 since no control pulse is applied to gate 85. The pulse from gate 85 sets flip-flop 89 to "1" and flip-flops 90 and 91 to "0" to store the binary number "100" therein. Then during the last $T/8$ seconds of this second 2T period, the next "read" pulse is applied to gates 92 to 94 to cause this new information from flip-flops 89 to 91 to be stored in the just-emptied shift register 96. The output pulse from gate 85 is also delayed $T/4+\alpha$ seconds in delay line 116 so that it arrives at combiner 120 in the same relative time position within its 2T period as did the previous pulse from gate 86 in its 2T period. This pulse is then passed from combiner 120 through delay 121 where it is delayed to the beginning of the third timing period as a synchronizing pulse for oscillator 125. This analysis may be continued for the remainder of the MPM pulses shown in curve B of FIG. 3, and it will be seen that the third MPM pulse will cause an output from gate 86, the fourth pulse will be encoded cos $\omega t$− sin $\omega t$ (011) and will cause an output from AND gate 84, and so on. Only one input MPM pulse and only one output pulse from gates 81 to 88 will occur during each timing period 2T. The train of binary pulses from the output of shift register 96 will be continuous and will have the form shown in curve A of FIG. 3.

While the MPM decoder circuit has been described in conjunction with operating a specific five baud teletype tape punch as a load, the serial binary information from the output of shift register 96 could also be utilized directly for some applications. Furthermore, if the information to be conveyed by this system is encoded directly into MPM codes without first being encoded in binary form, the outputs of gates 81 to 88 could be utilized directly since they represent the decoded MPM signals prior to their conversion to binary by the circuit of FIG. 7B. A similar circuit simplification would occur in the MPM encoder of FIG. 4 if the information were already in a form where it could be used to supply a gating potential to one of gates 21 to 28 during each timing period 2T. Then circuit elements 11 through 20 and their associated timing or clock circuits would be eliminated.

As the name implies, MPM is a modulation technique and in no way invalidates the use of any binary digital code such as Baudot or Fieldata or the various codes that have been developed to meet specialized requirements. Conventional parity bit techniques may be used if desired. Also, since the MPM system deals with the code bit formation, it does not preclude the use of conventional subcarrier and R.F. carrier modulation techniques used with conventional wire and radio transmission. In using carrier modulation techniques, it would be preferable but not necessary to use a carrier which is a harmonic of the frequency of the signal used to form the basic MPM bits. At the receiver this would facilitate recovery of the MPM signal.

While the principles of the invention have been described in connection with the above specific apparatus, it will be apparent to those skilled in the art that various modifications may be made without departing from the spirit and scope of the invention as set forth in the appended claims.

What is claimed is:

1. A pulse code modulation system for increasing the information density of a signal stream including means for generating a minus cosine waveform, a source of discrete binary signals, and means responsive to a predetermined number of said discrete binary signals for time quantizing single cycles of said minus cosine waveform to the particular ones of eight distinct locations within a timing period of 2T seconds which have been determined in advance to correspond to the information conveyed by each different group of said predetermined number of binary signals, each of said cycles of said minus cosine waveform having a period of T seconds.

2. A signal encoder for forming monocycle position modulation signals to convey intelligence including (a) means for generating a minus cosine waveform,
(b) a plurality of gates,
(c) means responsive to said intelligence for energizing a discrete one of said gates during each one of a sequence of equal timing periods,
(d) and means for commutating said gates at discrete intervals, said generating means being responsive to the outputs of said gates to cause a single cycle of a minus cosine wave to pass during each of said timing periods, the location of said wave within each of said periods being established by the times at which said gates are commutated.

3. A system according to claim 2 whereby said plurality of gates comprises eight gates and where each of said gates are commutated twice during each of said timing periods.

4. A signal encoder for forming monocycle position modulation signals to convey intelligence by means of single cycles of time quantized minus cosine waves having a period of T seconds including (a) means for generating said minus cosine waves,
(b) eight AND gates each having two inputs,
(c) means responsive to said intelligence to provide one input for each of said gates,
(d) commutating means connected to the other input of each of said gates for supplying enabling pulses sequentially to said gates at discrete intervals of $T/8$ seconds to thereby commutate each of said gates two times during a timing period of 2T seconds, and
(e) complementary flip-flop means connected to the outputs of said gates for energizing said minus cosine generator means to pass one cycle of an output wave having a period of T seconds for every two pulses passed by said gates.

5. Apparatus for forming monocycle position modulation signals from an input binary signal including, (a) a three stage shift register for temporarily storing different successive groups of three binary bits from said input signal,
(b) three flip-flops,
(c) means connected to said shift register for supplying the information stored therein in parallel to said three flip-flops to set them accordingly each time said shift register is filled with three different binary bits,
(d) a rectangular matrix connected to the outputs of said three flip-flops, said matrix having eight outputs corresponding to the eight possible combinations of three binary bits,
(e) eight AND gates connected to the respective outputs of said matrix,
(f) means for commutating said AND gates by supplying enabling pulses to said gates in sequence at discrete intervals of time whereby each of said gates receives two enabling pulses during each different setting of said three flip-flops, said enabling pulses causing output pulses from any one of said gates whenever coincidence occurs with an output of said matrix,
(g) a complementary flip-flop connected to the outputs of said AND gates, said output pulses from said gates alternately turning said complementary flip-flop first on then off, and
(h) a minus cosine generator connected to said complementary flip-flop and having an output only when said flip-flop is turned on, the frequency of the signal from said cosine generator being such that only a single cycle will occur during the length of time that said complementary flip-flop is turned on.

6. Apparatus according to claim 5 whereby said discrete intervals of time are $T/8$ seconds and said single cycle of the signal from said minus cosine generator has a period of T seconds.

7. A decoder for extracting the information from monocycle position modulation signals formed from single cycles of a periodic waveform, each of said cycles being time quantized to any one of a plurality of discrete locations within a basic timing period, said decoder including means for determining said discrete locations of each of said cycles, and means responsive to the output of said location determining means and having a plurality of outputs for supplying an indication of said cycle locations to corresponding discrete ones of said plurality of outputs.

8. A monocycle position modulation signal decoder according to claim 7 wherein said periodic waveform is a minus cosine wave and said location determining means is a plurality of synchronous detectors.

9. A monocycle position modulation signal decoder for decoding monocycle position modulation signals formed from single cycles of a minus cosine waveform, each of said cycles being time quantized to any one of a plurality of discrete locations within a basic timing period, said decoder including (a) local signal generating means for producing a plurality of orthogonal sine wave signals having the same frequency as said cycles of said minus cosine waveform, (b) a plurality of synchronous detectors, (c) means for supplying a different one of said orthogonal signals to each one of said detectors, (d) means for supplying said monocycle position modulation signals in parallel to said plurality of synchronous detectors, said detectors having an output when said monocycle position modulation signals and said orthogonal signals correlate therein, (e) and means responsive to the outputs of said synchronous detectors for energizing a plurality of discrete lines corresponding to said plurality of discrete locations occupied by said single cycles of said monocycle position modulation signals.

10. Apparatus according to claim 9 wherein said means responsive to the outputs of said detectors includes a plurality of AND gates and a plurality of INHIBIT gates, said INHIBIT gates each being associated with a different one of said detectors and having an output when correlation occurs only in the detector associated therewith, and said AND gates each being associated with different pairs of said detectors and having an output only when correlation occurs in both of said detectors associated therewith, whereby each of said gates energizes a different one of said discrete lines.

11. Apparatus according to claim 10 wherein said single cycles of said minus cosine waveform have a period of T seconds, said plurality of discrete locations are separated by intervals of $T/8$ seconds, and said basic timing period has a duration of 2T seconds.

12. Apparatus according to claim 11 wherein said plurality of discrete locations is eight; and said pluralities of orthogonal signals, said synchronous detectors, said AND gates, and said INHIBIT gates are four.

13. A pulse code modulation system for conveying intelligence including means for generating a minus cosine waveform periodically, means responsive to said intelligence for time quantizing single cycles of said waveform to any one of eight locations separated from one another by $T/8$ seconds within a timing period of 2T seconds, each cycle of said waveform having a period of T seconds, decoding means for determining in which of said eight locations said cycles are generated, said decoding means including a plurality of synchronous detectors in which said single cycles of said minus cosine waveforms are correlated with locally generated orthogonal sine wave signals.

References Cited by the Examiner

UNITED STATES PATENTS

| | | | |
|---|---|---|---|
| 2,272,070 | 2/42 | Reeves | 179—15 |
| 2,656,524 | 10/53 | Gridley | 179—15 |
| 2,750,566 | 6/56 | Westcott | 179—15 |
| 2,933,364 | 4/60 | Campbell | 179—15 |
| 2,994,790 | 8/61 | Delaney | 325—38 |
| 3,057,972 | 10/62 | Mann | 179—15 |

OTHER REFERENCES

Black, H. S. et al.: A Multichannel Microwave Radio Relay System. In Transactions of The A.I.E.E., vol. 65, December 1946.

DAVID G. REDINBAUGH, *Primary Examiner.*